Oct. 2, 1962   D. M. ADAMS ET AL   3,056,620
RESILIENT BUMPER PROTECTING MEANS
Filed Nov. 30, 1956   2 Sheets-Sheet 1
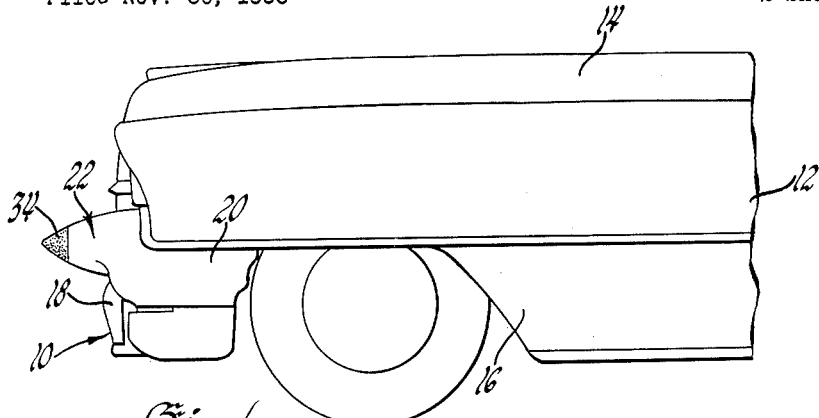
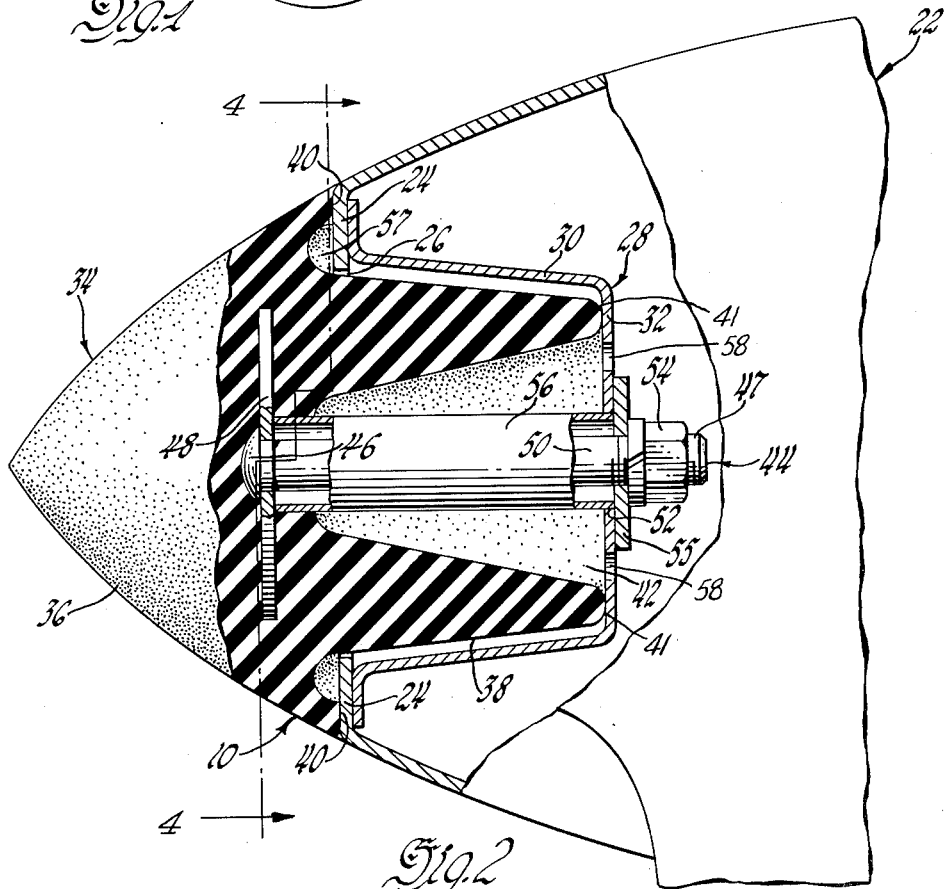
INVENTORS
Daniel M. Adams &
Clarence E. Morphew
BY
L. D. Burch
ATTORNEY.

Oct. 2, 1962 D. M. ADAMS ET AL 3,056,620
RESILIENT BUMPER PROTECTING MEANS
Filed Nov. 30, 1956 2 Sheets-Sheet 2

INVENTORS
Daniel M. Adams
Clarence E. Morphew

BY *L.D. Burch*
ATTORNEYS

United States Patent Office 3,056,620
Patented Oct. 2, 1962

3,056,620
RESILIENT BUMPER PROTECTING MEANS
Daniel M. Adams, Birmingham, and Clarence E. Morphew, Milford, Mich., assignors to General Motors Corporation, Detroit, Mich., a corporation of Delaware
Filed Nov. 30, 1956, Ser. No. 625,475
3 Claims. (Cl. 293—71)

The present invention relates to automotive vehicles and more particular to the bumper means therefor.

The styling of modern automotive vehicles has resulted in massive bumper structures blended into the surrounding sheet metal portions of the body. Since such bumper structures are normally very heavy and located in close proximity to the sheet metal body panels, the bumper is normally mounted on spring members secured directly to the chassis. In the event such a structure is subjected to an impact, a portion of the energy in the impact is transferred directly to the chassis. This is not only undesirable from a structural standpoint but in addition even a minor impact, such as frequently occurs, is very noticeable and irritating to the occupants of the vehicle. In addition, the impact members may be permanently deformed or at least the protective and/or decorative finish thereon may be marred.

It is now proposed to provide a bumper structure for an automotive vehicle having means thereon to protect the impact members from damage as a result of an impact thereon. This is to be accomplished by providing a resilient cushion adapted to absorb the energy of an ordinary impact without disfiguring the decorative surface or transferring a disproportionate amount of the energy in the impact to the vehicle chassis. More particularly, the cushion comprises a resilient material molded of some material such as rubber and mounted on a bumper guard secured to the bumper structure. Thus the cushion projects forwardly therefrom and is normally the first portion of the bumper structure to strike an obstruction. In addition, a portion of the cushion projects through an aperture in the end of the guard and contacts a cup-shaped bracket secured to the inside of the bumper guard. A bolt with a reinforcement plate on its head is molded into the cushion while the shank thereof projects through an aperture in the bracket. A sleeve encompasses the bolt with one end thereof in contact with the head to limit the stress the bolt may produce in the cushion. The sleeve is also slidably disposed in an aperture through the bracket so that in the event of an impact of sufficient force, the bolt and sleeve may telescope through the bracket and allow considerable deflection of the cushion.

In the one sheet of drawings:

FIGURE 1 is a fragmentary side view of an automotive vehicle having a bumper assembly with a resilient cushion thereon embodying the present invention.

FIGURE 2 is a side view, on an enlarged scale, of the cushion in FIGURE 1 with portions thereof being broken away.

Figure 3:
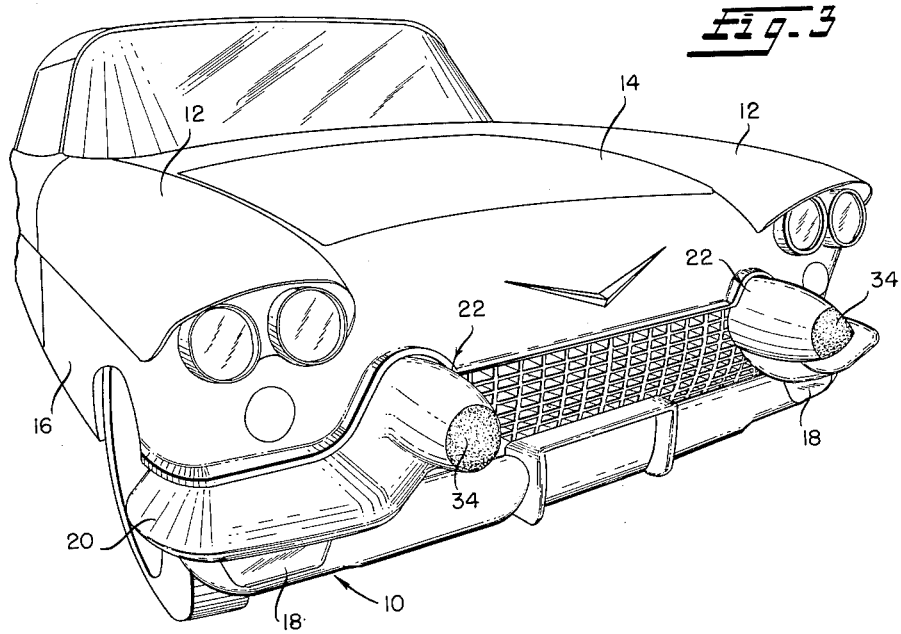
FIGURE 3 is a fragmentary perspective view of an automotive vehicle having a bumper assembly with the resilient cushion thereon embodying the present invention.
Figure 4:
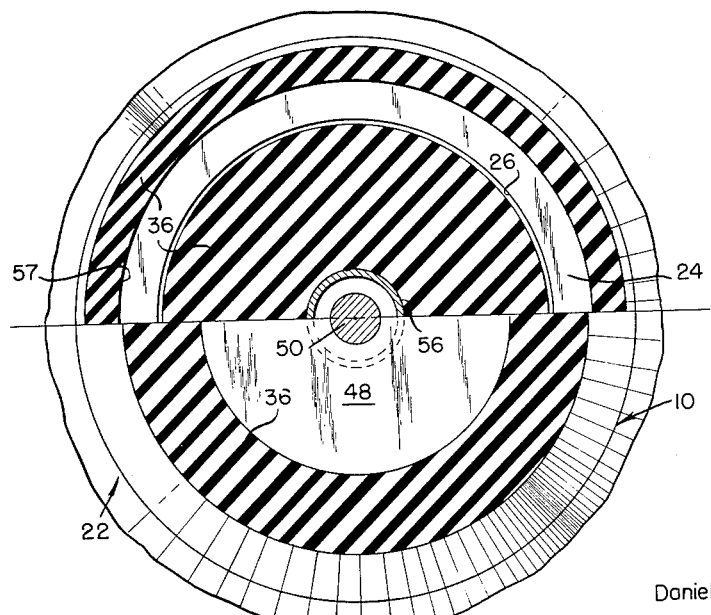
FIGURE 4 is an elevational view in section taken along the line 4—4 of FIGURE 2.

Referring to the drawings in more detail, the present invention may be incorporated into a bumper structure 10 extending across the front end of an automotive vehicle 12 having a sheet metal hood 14 and fenders 16. This bumper structure is mounted on the vehicle chassis by springs and includes one or more center impact members 18 which extend horizontally across the front end of the vehicle 12 and a pair of integral lateral wrap-around ends 20 that extend around the sides of the fenders 16.

A pair of impact receiving projections or guards 22 are secured to the impact members, inboard thereof respectively of the ends 20, to project forwardly therefrom and thereby be in position to normally be the first portion of the vehicle 12 to strike an obstruction. The guard 22 is a hollow member fabricated from material similar to that of the impact members 18. The front or impact receiving end of the guard is truncated to provide a generally flat surface in the form of a flange 24 that projects radially inwardly and defines an aperture 26 opening into the interior of the guard 22. A rigid bracket such as a metallic cup 28 having convergent sides 30 and a closed bottom 32 is welded to the back side of the radial flange 24, and thus forms a socket in the impact receiving end of the guard, the entrance to the socket being the aperture 26.

In order to absorb the energy of an impact on the bumper structure 10, a resilient cushion 34 is mounted on the forward end of the guard 22 and is the most forwardly projecting portion of the vehicle 12. This cushion 34 may be fabricated in any suitable manner but in the present instance it is molded of some suitable resilient material such as rubber which is adapted to absorb the force of the usual impact without any detrimental effect on the bumper structure 10.

The cushion 34 includes a first portion in the form of a tapered nose 36 and a second portion in the form of a hollow tail 38 of reduced section. The radial shoulder 40 which surrounds the juncture of these two portions 36 and 38 is adapted to seat on the radial flange 24. The exterior surface of the nose portion 36 tapers to form a smooth streamlined extension or continuation of the exterior surface of the guard 22. When the shoulder 40 is seated on the radial flange 24 the tail portion 38 projects through the aperture 26 and the innermost end 41 (as viewed in FIGURE 2) thereof engages the bottom 32 of the cup 28. Although the exterior of the tail portion 38 may be tapered to conform to the shape of cup 28, it has been found desirable for the tail portion 38 to have a tapered bore such as that formed by an inwardly extending passage 42. As a result if a force on the nose 36 forces the resilient material into the cup 28 it will not create an undue bursting force on the cup 28. It is, of course, apparent that since the resilient cushion 34 projects forwardly from the bumper structure 10, it should normally be the first portion to strike an obstruction and any compressive load on the cushion 34 will transmit the force of the impact to the flange 24 and/or to the cup 28. As a result the force of the usual impact will be absorbed without any detrimental effect on the bumper structure.

In order to secure the cushion 34 in position any suitable fastening means may be provided. In the present instance this fastening means comprises a bolt or stud 44 which has the head end 46 thereof embedded in the resilient material during the molding process. A reinforcement disk 48 may be provided on the head to minimize the amount of stress that can be produced in the resilient material. The shank 50 of the bolt 44 extends along the passage 42 through the tail section 38. The threaded end 47 of the shank 50 projects through a bottom-aperture 52 in the center of the bottom 32 of the cup 28. By tightening a nut 54 and washer 55 arrangement on the threaded end 47 of the bolt 44, the cushion 34 will be drawn inwardly and force the shoulder 40 and end 41 to be compressed against the flange 24 and cup bottom 32 respectively. By providing an annular recess 57 around the shoulder 40 the cushion can be more easily compressed so that the exterior will more nearly blend into the surface of the guard.

An enlarged sleeve 56 preferably is provided over the shank 50 of the bolt 44 with one end engaging the reinforcement plate 48 and the other end engaging the washer 55. As a result when the nut 54 is tightened enough to insure the cushion 34 being retained in position, any further tightening will only cause compression of the sleeve 56. This will be effective to limit the amount of stress and strain that can be created in the resilient material and prevent destruction thereof.

In addition, the exterior sleeve 56 may be a slidable fit in the bottom-aperture 52 in the cup bottom 32 so that it can move therein. Thus in the event of an impact against the nose 36 the resilient material can be compressed into the cup 28 while the bolt 44 slides rearwardly through the bottom-aperture 52.

Radially outwardly of the bottom-aperture 52 the cup bottom 32 is shown provided with two additional openings 58. These have no structural or operative function with respect to the cushion 34, and serve only to receive cup supporting means (not shown) used in locating the cup during welding to the flange 40 of the bumper guard in the course of manufacture.

We claim:

1. In an impact cushioning means for attachment to an impact receiving projection of a vehicle bumper, which projection has a generally cup-shaped bottom-apertured socket in its impact receiving end and a generally flat surface surrounding the socket entrance, said cushioning means comprising a cushion of resilient material having an impact receiving first portion said first portion having a generally pointed external configuration for constituting an extension of said bumper projection and a second portion of reduced section for extending into and abutting the bottom of said socket and an attaching stud for said cushion having a head at one end embedded in said first portion and a shank extending through said second portion for the purpose of extending through said aperture in the socket for connection with the projection at the bottom surface of the socket said first portion having a shoulder surrounding its juncture with said second portion, said shoulder being spaced radially and axially of said juncture to effect seating by said shoulder on said surface of the projection.

2. The impact cushioning means of claim 1 wherein the inner periphery of said second portion tapers away from the stud shank in the direction inwardly of the socket.

3. An impact cushioning means in combination with an impact receiving projection of a vehicle bumper, which projection has a generally cup-shaped bottom-apertured socket having a bottom surface and a back portion located remotely from the socket entrance, said socket located in the impact receiving end of said projection and a generally flat surface surrounding the entrance of said socket, said cushioning means comprising a cushion of resilient material having an impact receiving first portion, said first portion having a generally pointed external configuration that constitutes an extension of said bumper projection, a second portion of reduced section extending into said socket and abutting the bottom surface of said socket, an extending stud for said cushion having a stud head at one end embedded in said first portion and a shank extending through said second portion and extending through said aperture in the socket and connected with the projection of the socket by a nut which abuts the back portion of said socket, and a sleeve around said shank and extending between said stud head and said nut to limit the amount of strain that may be imposed on said cushion during movement thereof inwardly of said projection during assembly, said sleeve being slidably received in said socket aperture to allow inward movement of said cushion during impact whereby said inward movement is restrained by the resilient flexing of said second portion, said first portion of said cushion having a shoulder surrounding its juncture with said second portion, said shoulder being spaced radially and axially of said juncture to effect seating of said shoulder on said flat surface of the projection when said second portion is seated in the socket.

References Cited in the file of this patent

UNITED STATES PATENTS

| | | |
|---|---|---|
| D. 174,177 | Sipple et al. | May 17, 1955 |
| 1,619,087 | Pampinella | Mar. 1, 1927 |
| 1,665,780 | Hamburger | Apr. 10, 1928 |
| 1,727,070 | Kruckenberg et al. | Sept. 3, 1929 |
| 1,810,717 | Lord | June 6, 1931 |
| 1,915,249 | Jorgensen | June 20, 1933 |
| 1,930,189 | Barbara | Oct. 10, 1933 |
| 1,978,249 | Decaire | Oct. 23, 1934 |
| 2,031,954 | Jandus | Feb. 25, 1936 |
| 2,201,531 | Geb | May 21, 1940 |
| 2,230,333 | Painter | Feb. 4, 1941 |
| 2,243,462 | Fageol | May 27, 1941 |
| 2,263,599 | Tucker | Nov. 25, 1941 |
| 2,455,506 | Leslie | Dec. 7, 1948 |
| 2,606,785 | Fisher | Aug. 12, 1952 |
| 2,624,607 | Weigand | June 6, 1953 |
| 2,659,595 | Coda | Nov. 17, 1953 |
| 2,735,673 | Muller | Feb. 21, 1956 |
| 2,769,653 | Lazan | Nov. 6, 1956 |
| 2,788,998 | Wilfert | Apr. 16, 1957 |
| 2,858,159 | Borah | Oct. 28, 1958 |

FOREIGN PATENTS

| | | |
|---|---|---|
| 363,658 | Great Britain | Dec. 22, 1931 |
| 724,467 | France | Jan. 29, 1932 |
| 490,653 | Canada | Feb. 17, 1953 |
| 1,097,140 | France | Feb. 9, 1955 |